Patented Apr. 8, 1952

2,592,310

UNITED STATES PATENT OFFICE 2,592,310

POLYSTYRENE PLASTICS CONTAINING RESORCINOL MONOBENZOATE

Lester W. A. Meyer and William M. Gearhart, Kingsport, Tenn., assignors to Eastman Kodak Company, Rochester, N. Y., a corporation of New Jersey No Drawing. Application February 12, 1949, Serial No. 76,197

2 Claims. (Cl. 260—45.85)

This invention relates to polystyrene plastics, and more particularly to the stabilization of such plastics.

As is well known in the art, plastics having useful properties for a great many purposes can be prepared from polystyrene, with or without plasticizers. Many examples of suitable plasticizers are shown in the art. The choice of plasticizers forms no part of our invention. However, polystyrene plastics have not been entirely suitable for use in places where they are exposed to a considerable amount of ultra-violet light: e. g., out of doors. Upon outdoor exposure in a sunny climate, a whitish haze gradually develops, and progresses until the plastic disintegrates. The object of our invention is to produce polystyrene plastics which will have increased resistance to deterioration by ultra-violet light.

We have found that the addition of a small proportion of resorcinol monobenzoate,

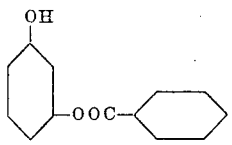

to a polystyrene plastic strongly inhibits breakdown of the plastic by exposure to ultra-violet light. We prefer to use approximately 1% of resorcinol monobenzoate, based on the weight of polystyrene, but we may use somewhat less than 1% or as high as 2% or even somewhat more.

In testing polystyrene plastics containing resorcinol monobenzoate, we have employed an accelerated weathering test in the Kline sunlight-fog chamber, ASTM designation D620-41T. This test is described in section B-14 of the Federal Specification for Plastics, Organic; General Specifications (Methods of Tests) L-P-406a, Method No. 6021, pages 57, 58 and 100, published by the U. S. Treasury Department, Federal Specifications Division. Two hundred hours under this test has been found to be roughly equivalent to one year of weathering in Washington, D. C. However, the climates of Florida and Arizona are much more severe as to ultra-violet light than the climate of Washington, D. C.

At the end of 325 hours in the Kline accelerated test, when samples about 0.050'' thick were used, a sample of a commercial polystyrene plastic had developed a whitish haze. A sample of the same polystyrene plastic in which 1% (based on the weight of the polystyrene) of resorcinol monobenzoate had been incorporated had not developed any haze until between 454 and 538 hours at which time both samples had become very slightly discolored.

Resorcinol monobenzoate may be incorporated in polystyrene plastics by any of the known methods of compounding such plastics. We have used the method of mixing and working on hot rolls as is well known.

What we claim as our invention and desire to be secured by Letters Patent of the United States is:

1. A polystyrene plastic relatively stable to ultraviolet light consisting principally of polystyrene, and containing as an essential ingredient approximately 1%-2% of resorcinol monobenzoate based on the weight of the polystyrene.

2. A polystyrene plastic relatively stable to ultraviolet light consisting principally of polystyrene and a plasticizer therefor, and also containing as an essential ingredient approximately 1%-2% resorcinol monobenzoate based on the weight of the polystyrene.

LESTER W. A. MEYER.
WILLIAM M. GEARHART.

REFERENCES CITED

The following references are of record in the file of this patent:

UNITED STATES PATENTS

| Number | Name | Date |
| --- | --- | --- |
| 2,034,283 | Clarke et al. | Mar. 17, 1936 |
| 2,304,466 | Matheson et al. | Dec. 8, 1942 |